(12) United States Patent
Weng et al.

(10) Patent No.: US 9,021,087 B1
(45) Date of Patent: Apr. 28, 2015

(54) METHOD TO IMPROVE CACHING ACCURACY BY USING SNAPSHOT TECHNOLOGY

(75) Inventors: Zhi Weng, San Jose, CA (US); Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 596 days.

(21) Appl. No.: 13/359,516

(22) Filed: Jan. 27, 2012

(51) Int. Cl.
*G06F 15/167* (2006.01)
*G06F 15/173* (2006.01)
*H04L 29/08* (2006.01)
*G06F 11/14* (2006.01)

(52) U.S. Cl.
CPC ........ *H04L 67/1095* (2013.01); *G06F 11/1458* (2013.01)

(58) Field of Classification Search
CPC ............ G06F 11/1458; G06F 2201/84; H04L 67/1095
USPC .................................................. 709/213.224
See application file for complete search history.

(56) References Cited

U.S. PATENT DOCUMENTS

| | | | |
|---|---|---|---|
| 7,237,075 B2 | 6/2007 | Welsh et al. | |
| 7,644,109 B2 | 1/2010 | Manley et al. | |
| 8,527,722 B1* | 9/2013 | Okada | 711/162 |
| 2002/0133537 A1 | 9/2002 | Lau et al. | |
| 2003/0167380 A1 | 9/2003 | Green et al. | |
| 2007/0168404 A1* | 7/2007 | Nakamura et al. | 707/204 |
| 2007/0250663 A1 | 10/2007 | Welsh et al. | |
| 2008/0098173 A1 | 4/2008 | Chidambaran et al. | |
| 2009/0193064 A1* | 7/2009 | Chen et al. | 707/204 |
| 2011/0106939 A1* | 5/2011 | Kitamura et al. | 709/224 |
| 2012/0158663 A1* | 6/2012 | Nakamura et al. | 707/649 |

\* cited by examiner

*Primary Examiner* — Larry Donaghue
(74) *Attorney, Agent, or Firm* — Fish & Richardson P.C.

(57) ABSTRACT

Methods and systems for improving caching accuracy utilizing snapshot technology are provided. One or more requests for data are received. When the requests for data return valid data, the valid data is stored within a cache. The response performance of a server device is monitored. When the response performance of the server device is above a predetermined threshold, one or more snapshot versions of a memory block are taken. The memory block may include the current state of the valid data at the time the snapshot version was taken. Upon receiving a warm-up cache signal for the cache, a snapshot version is used to populate the cache and sent to a client device.

40 Claims, 6 Drawing Sheets

METHOD TO IMPROVE CACHING ACCURACY BY USING SNAPSHOT TECHNOLOGY

BACKGROUND

1. Field

Embodiments are generally related to a system and method to improve caching accuracy by using snapshot technology.

2. Related

A cache allows for the storage of data, so that future requests for that data can be served faster. When data is requested, if the data exists within the cache, this request can be served quickly by reading the cache. Alternatively, when the requested data is not contained within the cache, the data is retrieved from the original storage location, which is comparatively slower. Snapshot technology enables the copying and preservation of a state of a storage device at any given moment for restoring the storage device in the event that it fails.

BRIEF SUMMARY

Embodiments described herein relate to methods and systems for improving caching accuracy by utilizing snapshot technology. One or more requests for data are received. The requests for data may be requests to load one or more web pages. When the requests for data return valid data, the valid data is used to populate a cache. The response performance of a server device is monitored. When the response performance of the server device is above a predetermined threshold, one or more snapshot versions of a memory block are taken. The memory block may include the current state of the data in the cache at the time the snapshot version was taken.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

"Warming up" a cache is the preloading of a server's cache with data that was referenced the last time the database was started. It is designed to help reduce the execution times of the initial queries executed against a database. This results in improved performance when the same or similar queries are executed against a database, each time it is started.

Warming up a cache involves a server checking whether a database contains a previously recorded collection of pages. If it does, the server loads the corresponding pages into a cache. The database can still process requests while the cache is loading pages, but warming up may stop if a significant amount of I/O activity is detected in the database. In such an case, warming up of the cache stops to avoid performance degradation of queries that access pages that are not contained in the set of pages being reloaded into the cache. However, this is done at a cost to the user, who may experience delay until the warm up process reconvenes.

A caching system, as described herein, allows for the use of a snapshot version of data to be returned when requested. In an example use of such a caching system, one or more requests for data are received. These requests may be, for example, one or more HTTP messages from a client device, such as a web browser. Upon, receiving the one or more requests for data, a server device stores the data within a cache for faster retrieval at a later time. The response performance of the cache is monitored to determine the state and accuracy of the cache system. Upon each request for data, a cache access of the cache is performed to determine if the data is presently stored in the cache. If the data is found within the cache, this is considered a cache hit. If the data is not found within the cache, this is considered a cache miss, which results in data retrieval from another source. The response performance of the cache is the ratio of the total number of cache hits to the total number of cache accesses. When the system has been monitored for a significant amount of time and the response performance of the cache is determined to be above a predetermined threshold, a snapshot version of the current state of the data within the cache is taken and stored. A snapshot version creates a point-in-time copy of the data within the cache. For example, a response performance of the cache of at least 0.85 over a span of an hour indicates that 85% of the cache accesses resulted in a cache hit and the return of reliable and accurate data. At that moment in time, a snapshot version of the data in the cache is taken.

Upon receiving a warm-up cache signal to populate the cache during subsequent start-ups or restarts of the system, a snapshot version of the data is loaded into the cache and the snapshot version of the data is sent in response to any requests for that data. Since the data loaded during a request will be a snapshot version of the data with a high response performance, the accuracy of the data within the cache is improved. This results in improved request-response performance time between the client device and the server While a client-server relationship and HTTP have been described, it may be recognized by one skilled in the art that other protocols and architectures may serve as the basis of data exchange, such as peer-to-peer networking.

Figure 1:
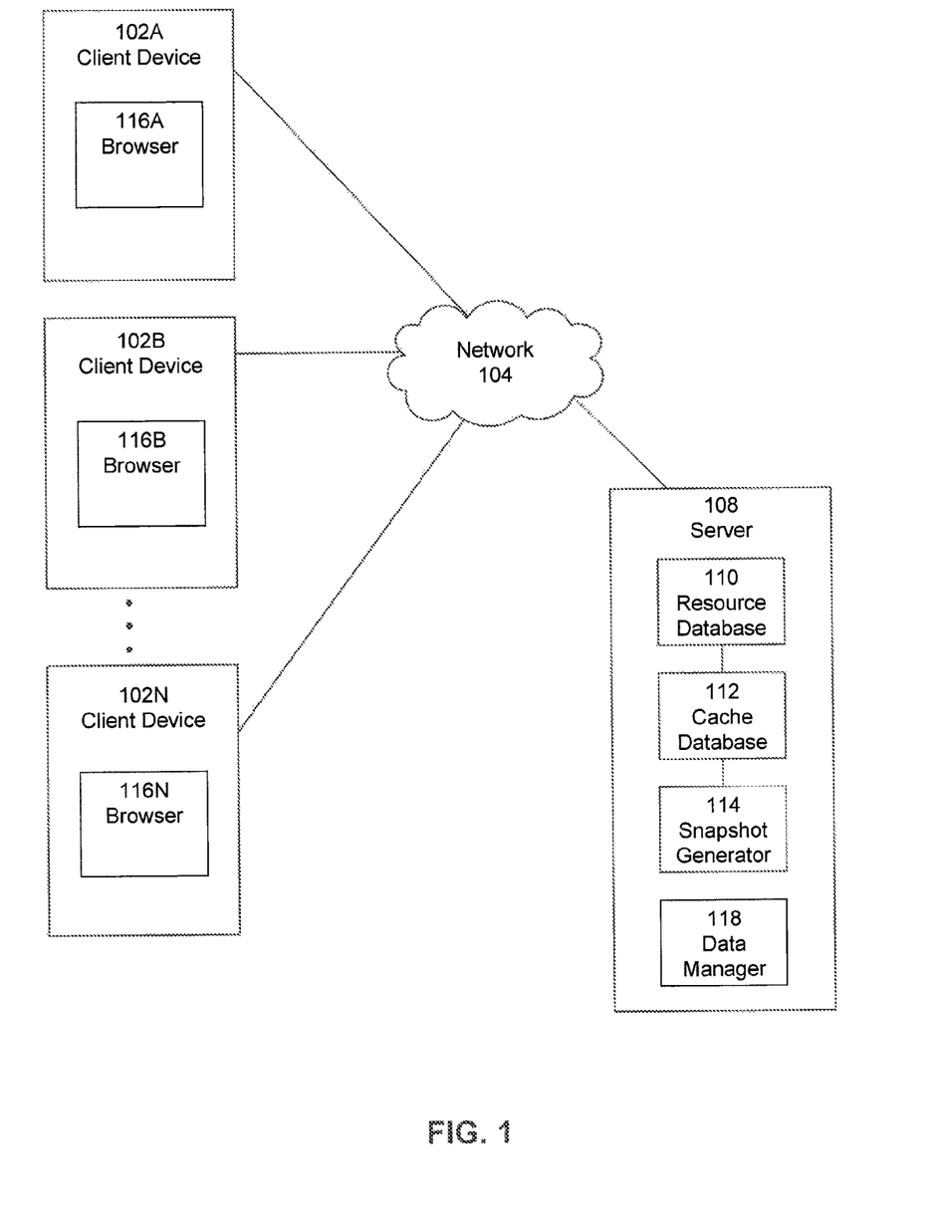
FIG. 1 is a diagram illustrating an exemplary system, according to an embodiment.

FIG. 1 is a diagram illustrating an exemplary system, according to an embodiment. FIG. 1 illustrates a snapshot cache system 100.

Snapshot system 100 includes one or more client devices 102A, 102B . . . 102N and server 108, coupled via one or more networks 104, such as the Internet or local area network. Client devices 102A, 102B . . . 102N includes respective browser applications 116A, 116B . . . 116N. Server 108 includes resource database 110, cache database 112, snapshot generator 114, and data manager 118.

In general, snapshot system 100 operates as follows: One or more requests for data from client devices 102A, 102B . . . 102N utilizing respective browsers 116A, 116B . . . 116N are received by data manager 118. In response to the request for data, data manager 118 retrieves the data from resource database 110 while storing a copy of the data within cache database 112. Upon, subsequent requests for the same data, data manager 118 retrieves the data from cache database 112. Snapshot generator 114 monitors the response performance of cache database 112 by measuring the ratio of cache hits in relation to the number of cache accesses. After a significant amount of time, when the response performance of cache database 112 is measured and determined to be above a predetermined threshold, a snapshot version of the data within cache database 112 is taken and stored within a storage device. Upon receiving a request to warm up the cache, the storage device is accessed and a snapshot version of the data is retrieved based on a send priority and stored in cache database 112. Server 108 then sends the data of the snapshot version to client devices 102A, 102B . . . 102N when requested.

Client devices 102A, 102B . . . 102N are processor-based electronic devices that may be manipulated by a user and are capable of requesting and receiving resources 110 over network 104. Examples of client devices 102A, 102B . . . 102N may include personal computers, mobile communication devices and tablet computers. Client devices 102A, 102B . . . 102N typically include an application, such as browsers 116A, 116B . . . 116N. A user may utilize browsers 116A, 116B . . . 116N to request data in resource database 110, such as HTML pages over network 104. For example, a user requests data within resource database 110 by typing the resource address associated with that data. In response to the request, server 108 delivers the data within resource database 110 to client devices 102A, 102B . . . 102N. Alternatively, the request for data by client devices 102A, 102B . . . 102N can be satisfied by server 108 utilizing the snapshot version of the data within resource database 110, as will be discussed below. When client devices 102A, 102B . . . 102N receive data from server 108, client devices 102A, 102B . . . 102N use respective browsers 116A, 116B . . . 116N to display the data to the user.

Network 104 may be any network or combination of networks that can carry data communications. Such a network 104 may include, but is not limited to, a local area network, metropolitan area network, and/or wide area network such as the Internet. Network 104 can support protocols and technology including, but not limited to, World Wide Web (or simply the "Web") protocols such as a Hypertext Transfer Protocol ("HTTP") protocols, and/or services. Intermediate web servers, gateways, or other servers may be provided between components of the system shown in FIG. 1, depending upon a particular application or environment.

Server 108 is a computing device or an application executing on a computing device that hosts resource database 110. Resource database 110 may store data associated with a domain name. Resource database 110 can be hosted by one or more servers 108. Server 108 delivers data within resource database 110 to client devices 102A, 102B . . . 102N. Resource database 110 can store any data that can be provided over network 104. The data stored in resource database 110 may be identified by a resource address that is associated with each domain name. The data within resource database 110 may include, for example, hypertext markup language (HTML) pages, word processing documents, portable document format (PDF) documents, images, video, and feed sources. The data in resource database 110 can include content, such as words, phrases, images and sounds, that may include embedded information (such as meta-information in hyperlinks) and/or embedded instructions (such as JavaScript scripts). Further embodiments will be described using one client device 102A. However, it will be known by one skilled in the art that any number of client devices 102A, 102B . . . 102N may be used.

Server 108 includes data manager 118 and cache database 112. In one embodiment, data manager 118 includes the functionality to store, organize, manage, and access data in cache database 112. According to an embodiment, upon a request for data by client device 102A, data manager 118 receives the request and searches for the data within resource database 110. Data manager 118 retrieves the data within resource database 118 and a copy of the data is stored within cache database 112. Cache database 112 may be any type of structured memory, including a persistent memory. For example, cache database 112 may be implemented as an array, relational database or file system. Upon subsequent requests for the same data, data manager 118 will provide the copy of the data within cache database 112 to client device 102A. Snapshot generator 114 monitors the response performance of cache database 112. In an embodiment, the response performance of cache database 112 is determined by the ratio of cache hits within cache database 112 to the number of cache accesses of cache database 112. Every request from client device 102A results in a cache access of database 112 to determine whether a copy of the data is stored within cache database 112. A cache hit is a request from client device 102A which can be satisfied by accessing cache database 112. A cache miss is a request from client device 102A which cannot be satisfied by accessing cache database 112. A cache miss will result in a query of resource database 110 to satisfy the data request, as described above.

In an embodiment, the response performance of cache database 112 is monitored for a predetermined amount of time. When the response performance of cache database 112 is above a predetermined threshold, snapshot generator 114 generates and stores one or more snapshot versions of the data within cache database 112. The one or more snapshot versions are copies of the data within cache database 112 at different times when the response performance of cache database 112 is above the predetermined threshold. Upon initial startup or restart of server 108, data manager 118 sends a warm-up cache signal to populate cache database 112. Snapshot generator 114A selects and loads a snapshot version in cache database 112. Upon a subsequent request for data from client device 102A, data manager 118 sends the copy of the data of the selected snapshot to client device 102A. Further details of the snapshot versions are discussed below.

In an embodiment, each of the constituent parts of system 100 may be implemented in hardware, software, firmware, or any combination thereof. Likewise, modules or instructions that constitute operative parts of embodiments may utilize any type of structured memory, including a persistent memory. In an example, each data storage infrastructure may be implemented as a relational database.

It should be noted that computer-readable storage medium embodiments may include any physical medium which is capable of having instructions encoded thereon that may subsequently be used by one or more processors to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible storage medium that can serve in the role of providing instructions to one or more processors may be used to store the instructions in these embodiments.

Figure 2:
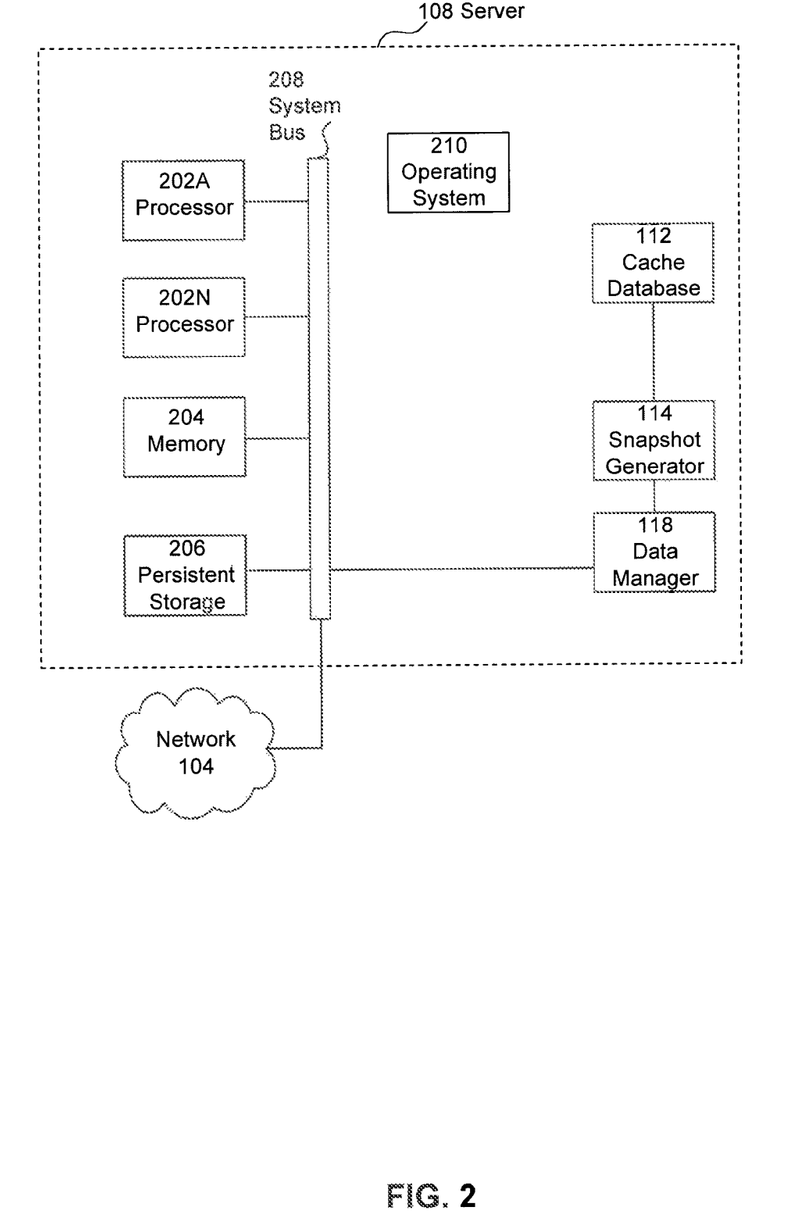
FIG. 2 is a diagram illustrating an exemplary server, according to an embodiment.

FIG. 2 is a more detailed diagram of components of the system in FIG. 1, according to an embodiment. FIG. 2 illustrates server 108 where the back-end of snapshot cache system 100 may be located.

Server 108 contains a combination of hardware, software, and firmware constituent parts that allow it to operate cache database 112 and snapshot generator 114 with access to additional resources over a network 104. Server 108 may be a conventional computer such as a desktop or laptop PC, but it may additionally be any web-enabled device that is able to manage data for the snapshot cache system 100. Server 108 as shown in FIG. 2 may be organized around a system bus 208, but any type of infrastructure that allows the hardware infrastructure elements of server 108 to communicate with and interact with each other may be used to function as this part of snapshot server 108.

The processing task in the embodiment of FIG. 2 is carried out by one or more processors 202A . . . 202N, but it should be noted that any type of processing technology may be used here, including multi-core processors, multiple processors, or distributed processors. Additional specialized processing resources such as graphics, multimedia, or mathematical processing capabilities may also be used as adjuncts or replacements for processors 202A . . . 202N for certain processing tasks.

In order to manipulate data, according to an embodiment, processors 202A . . . 202N access a memory 204 via system bus 208. Processors 202A . . . 202N and memory 204 operate in conjunction with operating system 210 to provide basic functionality for server 108.

In an embodiment, server 108 includes cache database 112 and snapshot generator 114, which may be configured to generate snapshot versions of stored data within cache database 112 and populate cache database 112 with a snapshot version of data upon startup or restart of server 108.

Figure 3:
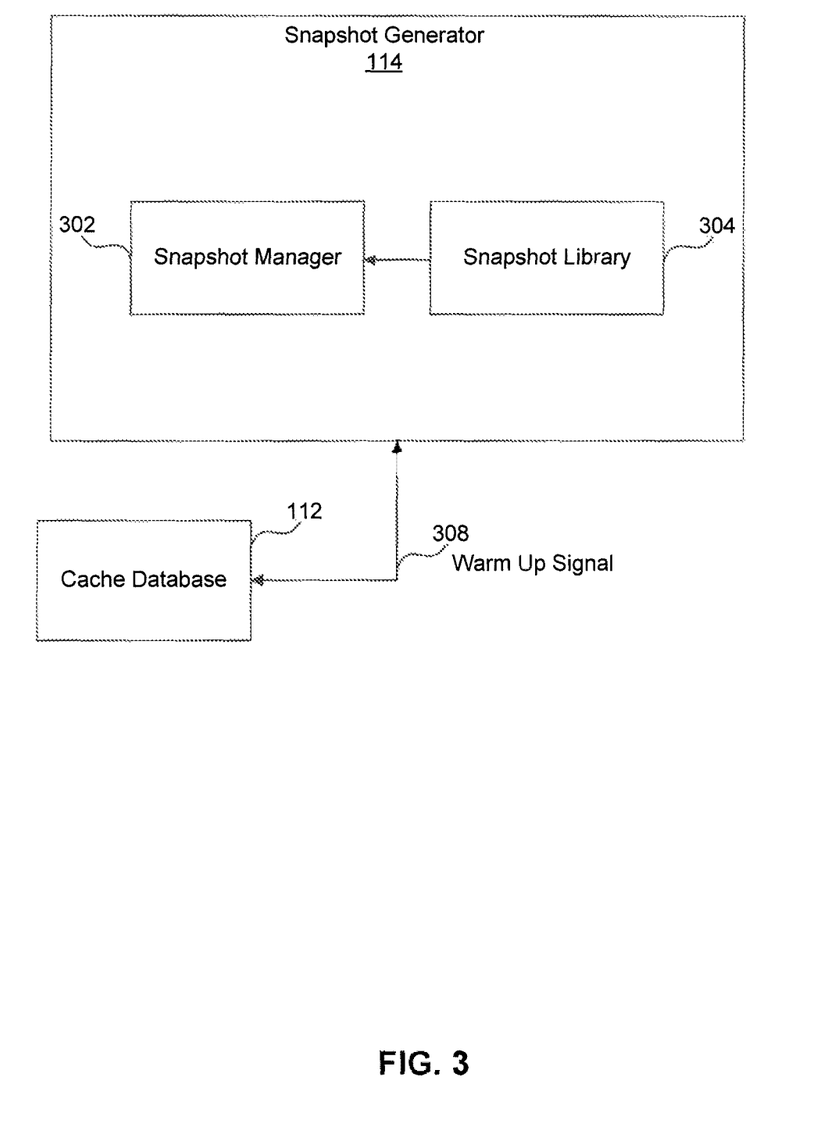
FIG. 3 is a diagram illustrating an exemplary snapshot generator, according to an embodiment.

FIG. 3 is a block diagram of an exemplary snapshot generator 114. Snapshot generator 114, or any combination of its components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

Figure 4:
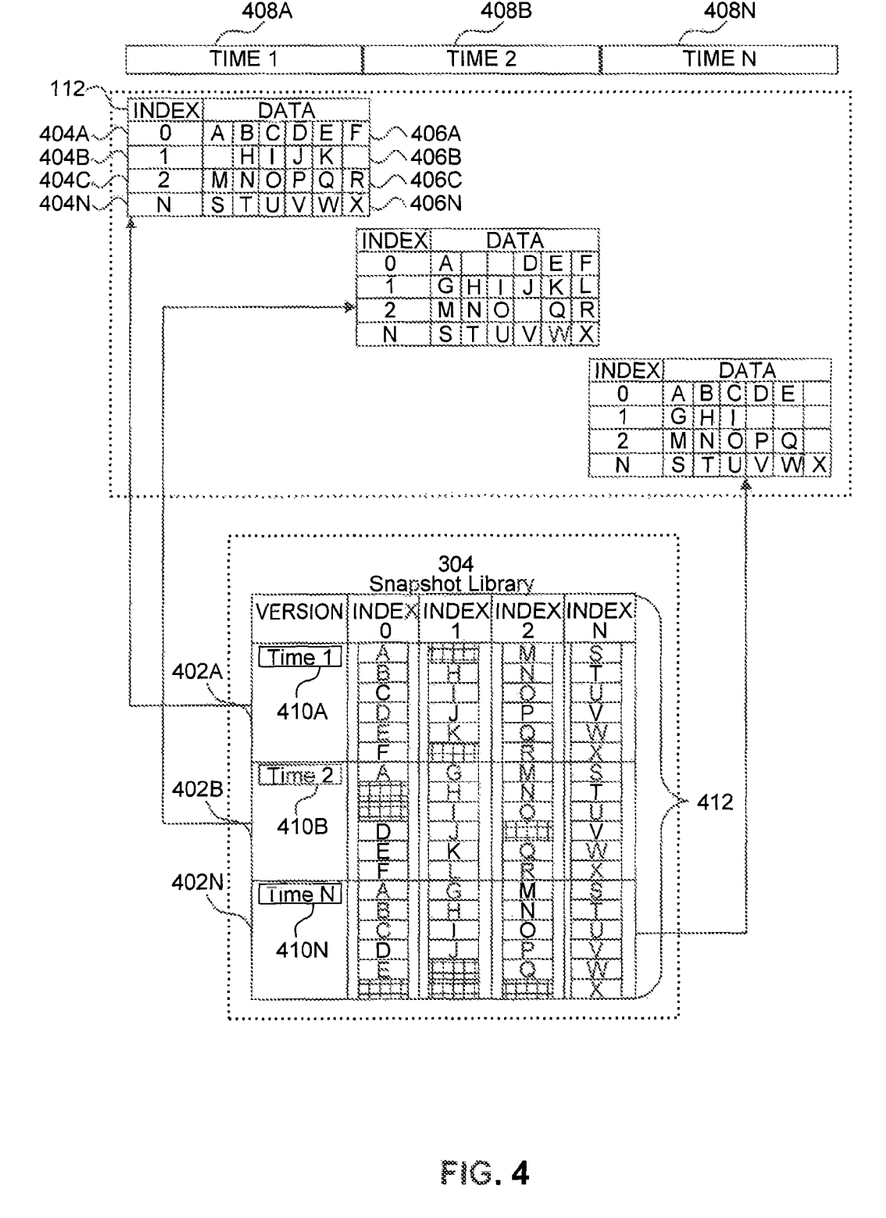
FIG. 4 is a diagram illustrating an exemplary snapshot operation, according to an embodiment.

Snapshot generator 114 may include a snapshot manager 302 and a snapshot library 304. Snapshot generator 114 is in communication with cache database 112, which may be used to store data. Snapshot generator 116 may allow for the generation of a snapshot version of data within cache database 112. By performing a snapshot of cache database 112, snapshot manager 302 and snapshot library 304 are configured to copy, store, and manage data within cache database 112. For example, upon a determination that the performance of cache database 112 is above a predetermined threshold, a snapshot version of the data in cache database 112 will be taken and stored in snapshot library 304. Upon startup or restart of server 108, a warm-up cache signal to populate cache database 112 will be received by snapshot generator 114. The snapshot version of the data stored within snapshot library 304 will be retrieved and loaded into cache database 112. Further embodiments will be described using a combination of FIG. 1 and FIG. 4. FIG. 4 is a detailed illustration of an example snapshot operation of snapshot system 100.

In one embodiment, one or more requests for data are received by server 108 from client device 102A. Upon retrieval of the data from resource database 110, a copy of the data is stored within cache database 112. For example, a user utilizing client device 102A may use respective browser application 116A to type in a URL for a website. The URL is sent as a request message to server 108. Server 108 searches for the URL within resource database 110. Once the URL is found, the data associated with that URL is copied into cache database 112. A response message containing the data is then sent to client device 102A for display. This is done for a plurality of data requests. Upon subsequent requests for the same data, the data is retrieved from cache database 112 instead of resource database 110.

In an embodiment, snapshot manager 302 of snapshot generator 114 monitors a response performance of server 108. A response performance of server 108 may be the measure of cache hits to cache accesses of cache database 112, according to an embodiment. For example, upon each request for data from client device 102A, cache database 112 is searched to determine whether the data is within the cache. The search for data within cache database 112 represents a cache access. When the data is located within cache database 112, it represents a cache hit and this data is sent to client device 102A. When the data is not located within cache database 112, it represents a cache miss and server 108 accesses resource database 110 to retrieve and send the data to client device 102A. According to an embodiment, the ratio of cache hits to cache accesses represents the response performance of server 108.

According to an embodiment, snapshot manager 302 may monitor the response performance of server 108 for a predetermined amount of time. When the response performance of server 108 is above a predetermined threshold, snapshot manager 302 takes a snapshot version of the cache database 112. For example, cache manager 302 may monitor the number of cache hits in relation to the number of cache accesses of cache database 112 over a period of 5 hours. During that 5 hour period, if the ratio of cache hits to cache accesses is above a predetermined threshold of 0.85, snapshot manager can take a snapshot version of cache database 112 and store the snapshot version within snapshot library 304. In the example above, a response performance above a predetermined threshold of 0.85 indicates that cache database 112 generates a cache hit at least 85 percent of the time in which cache database 112 is searched due to a request for data from client device 102A.

FIG. 4 is a detailed illustration of an example operation of snapshot system 100. Cache database 112 is illustrated during a time period 408A, 408B . . . 408N. Cache database 112 has one or more index entries 404A, 404B, 404C . . . 404N with corresponding data blocks 406A, 406B, 406C . . . 406N.

According to an embodiment, index entries 404A, 404B, 404C . . . 404N may be a unique number corresponding to the physical location of data blocks 406A, 406B, 406C . . . 406N within cache database 112. Snapshot library 304 may be any type of structured memory, including a persistent memory. For example, snapshot library 304 may be implemented as an array, relational database or file system. In an embodiment, cache manger 302 generates snapshot versions 402A, 402B . . . 402N of snapshot library 304 during time period 408A, 408B . . . 408N. Time period 408A, 408B . . . 408N, are the moments when the response performance of server 108 is above the predetermined threshold. In the example above, time period 408A, 408B . . . 408N may be the moment in time when cache database 112 generates a cache hit at least 85 percent of the time. Snapshot library 304 stores a copy of the data blocks 406A, 406B, 406C . . . 406N from cache database 112. According to an embodiment, there may be one or more snapshot versions 402A, 402B, 402N. Snapshot versions 402A, 402B . . . 402N may have a time stamp 410A, 410B . . . 410N, which corresponds to time period 408A, 408B . . . 408N. An identical copy of data blocks 406A, 406B, 406C . . . 406N of cache database 112 can be stored within snapshot table 412 of snapshot library 304. Snapshot table 412 is configured to store identical copies of data blocks 406A, 406B, 406C . . . 406N using index entries 404A, 404B, 404C . . . 404N and time period 408A, 408B . . . 408N. For example, a copy of index entries 404A, 404B, 404C . . . 404N of cache database 112 at time period 408A, is stored as snapshot version 402A with a time stamp of 410A.

In an embodiment, upon a restart of server 108, a warm-up cache signal 308 may be received by snapshot generator 114. Warm-up cache signal 308 may be a signal giving an instruction to populate cache database 112 with initial data which may be sent in response to requests from client devices 102A, 102B . . . 102N. Once snapshot generator 114 receives warm-up cache signal 304, snapshot manager 302 retrieves a snapshot version 402A, 402B . . . 402N from snapshot library 304. The data from the retrieved snapshot version 402A, 402B . . . 402N is used to populate cache database 112. According to an embodiment, each snapshot version 402A, 402B . . . 402N may be assigned a send priority. The send priority may determine which snapshot version 402A, 402B . . . 402N will be selected to populate cache database 112, according to an embodiment. For example, snapshot version 402A, 402B . . . 402N may have a send priority based on the response performance. A higher response performance of cache database 112 may result in a higher send priority assigned to snapshot version 402A, 402B . . . 402N when the snapshot version is generated at time period 408A, 408B . . . 408N. According to an embodiment, other factors may determine the send priority of a snapshot version 402A, 402B . . . 402N, such as the performance rate of a client device, the size of the data or the kind of data.

Overview of the Method

Figure 5:
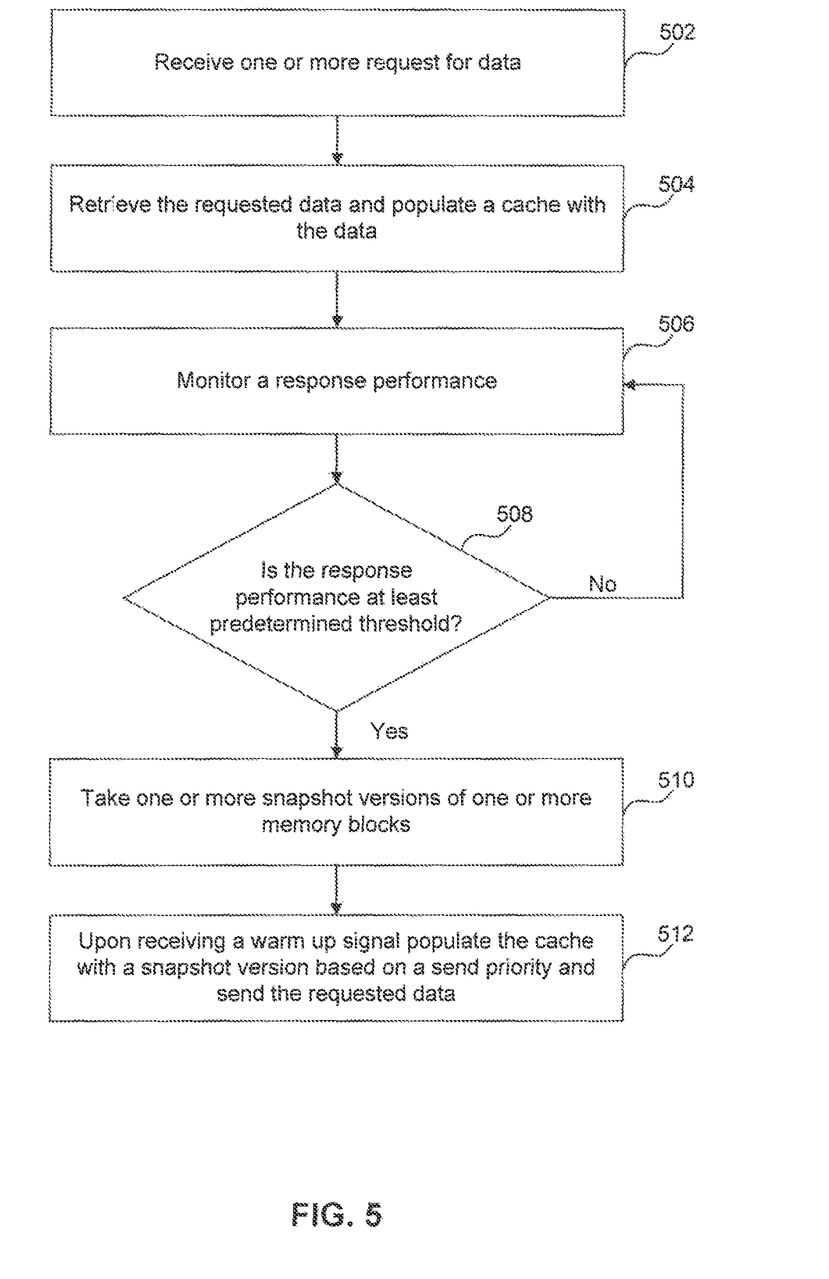
FIG. 5 is a flowchart of an exemplary method, according to an embodiment.
Figure 6:
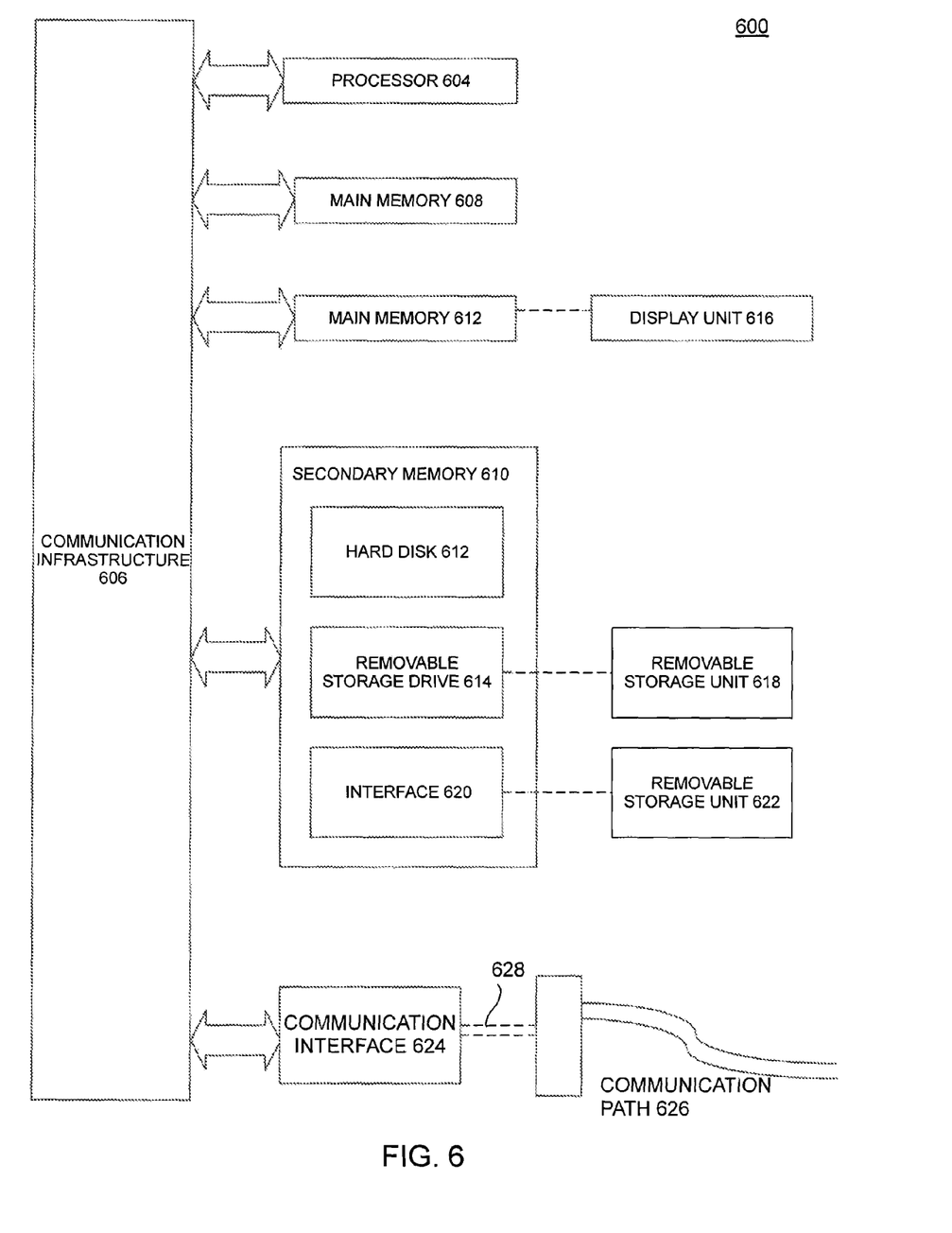
FIG. 6 is a block diagram of a computer system in which embodiments can be implemented.

FIG. 5 is a flowchart of an exemplary method 500 of improving initial caching accuracy, according to an embodiment.

In stage 502, one or more requests for data are received. For example, such data requests may be received by data manager 118 of server 108. The one or more requests for data may include HTTP requests generated by a user of client device 102A, for example, via respective browser 116A. For example, a user may type the name of a website domain name into a browser 116A, 116B . . . 116N, which generates a request message that may be received by server 108. The data requested may be all of the content associated with a web page of the website domain that is stored on a storage device.

In stage 504, the data requested by client device 102A may be retrieved and copied into a cache. For example, stage 504 may be performed by data manager 118 in conjunction with resource database 110 and cache database 112 on server 108. In response to the one or more requests for data, server 108 conducts retrieval of the data from resource database 110. Resource database 110 includes the original content of the data. Upon the retrieval of the data from resource database 110, a copy of the data is stored within cache database 112. Upon subsequent requests for the same data, cache database 112 may be searched initially to retrieve the data. Upon retrieval of the data from resource database 110 or cache database 112, a response message can be sent containing the requested data. In the example above, all of the contents of the webpage requested by the user may be retrieved from resource database 112 initially and stored within cache database 112 for all subsequent requests for the webpage and its content. In an embodiment, multiple requests for data are received and all the data for each request is stored in cache database 112.

In stage 506, a response performance of server 108 is monitored. For example, stage 506 may be performed by snapshot generator 114 on server 108. The response performance of server 108 is determined by the hit rate of cache database 112, according to an embodiment. The hit rate is the measure of cache hits to cache accesses. A high hit rate of cache database 112 indicates increased accuracy of the requested data along with a reduced latency for the responses to the one or more data requests. In the example above, if the data for the requested webpage resides within cache database 112, a cache hit is recorded. If the data for the requested webpage does not reside within cache database 112, a cache access will be performed with the generation of a cache miss. The data for the webpage is then retrieved from resource database 110.

At stage 508, it is determined whether the response performance of server 108 is above a predetermined threshold. For example, stage 508 may be performed by snapshot generator 114 on server 108. When the response performance is determined to be equal to or greater than a predetermined threshold level, method 400 proceeds to stage 510. If the response performance is below the predetermined threshold, then stage 508 will repeat until the threshold is met or surpassed. For example purposes only, the predetermined threshold level may be 0.85. This represents a hit rate of 85 percent of cache database 112. In the example above, all of the cache accesses of cache database 112 for the requested webpages will be monitored to determine when the content of the requested webpages are retrieved from cache database 112 at least 85 percent of the time.

At stage 510, one or more snapshot versions of one or more memory blocks of cache database 112 is taken. For example, stage 510 may occur at snapshot generator 114 on server 108. In the example above, when the response performance is greater than or equal to 0.85, a snapshot version of the data within cache database 112 is taken. A snapshot version is a copy of the data at a time when the response performance is greater than the predetermined threshold of 0.85. One or more snapshot versions may be taken of cache database 112 and time stamped with the time the data was copied, according to an embodiment. The one or more snapshot versions may be stored in a snapshot library 304. In an embodiment, a send priority is assigned to each of the snapshot versions within snapshot library 304. The send priority may be determined by the response performance value. A higher response performance value may result in a higher assigned priority for a snapshot version.

At stage 512, when server 108 is started or restarted, a warm-up cache signal may be received. A snapshot version is loaded into cache database 112 and sent in a response message. For example, stage 512 may be performed by data manager 118 on server 108. Upon the restart of server 108, a warm-up cache signal may be sent to populate cache database 112. Snapshot generator 114 will search snapshot library 304 for matching snapshot versions taken during stage 408 and load the data of the selected snapshot version into cache database 112. The selected snapshot version may be the matching snapshot version with the highest send priority. Once the data is populated from the selected snapshot version into cache database 112, a response message including the snapshot version data is sent by data manager 118. In the example above, upon a startup or restart of server 108, a snapshot version of the previous requests for the webpage will be loaded into cache database 112. Upon subsequent requests for the webpage, a snapshot version of the webpage and its content will be sent to the user for display.

Additional Features

It should be noted that embodiments described above, may be performed using different kinds of snapshot algorithms. Two kinds of snapshot algorithms will be described below using embodiments discussed previously.

Copy-on-Write Algorithm

A snapshot operation utilizing a copy-on-write algorithm includes a pre-designated space for a snapshot version. When a snapshot version of cache database 112 is first created, the metadata about the location of the data within cache database 112 is copied. The physical copy of the data within cache database 112 does not take place initially. This results in almost immediate creation of the snapshot version. According to an embodiment, the snapshot version may track when the blocks of data within cache database 112 change. Blocks of data within cache database 112 may change when a write operation is performed on the data. The blocks of data within cache database 112 are copied into the pre-designated space for the snapshot version prior to the write operation, according to an embodiment. This allows the data of the snapshot version data to remain consistent with the data in cache database 112 at the exact time the snapshot version was taken. Read requests of the unchanged data blocks of cache database 112 are redirected to cache database 112, while read requests to data blocks that have been changed are directed to the data blocks in the snapshot version.

Utilizing the copy-on-write snapshot algorithm may initially impact performance, because write requests to cache database 112 must wait while the original data is being copied to the snapshot version. However, use of the copy-on-write algorithm requires less space, because the storage required to create a snapshot version is minimal to hold only the data that is changing.

Redirect-on-Write Algorithm

A snapshot operation utilizing a redirect-on-write algorithm is similar to the copy-on-write algorithm. The original blocks of data within cache database 112 remain intact. One or more new write operations to cache database 112 are redirected to the snapshot library 304, according to an embodiment. One advantage of redirecting the write operations to the snapshot library 304 is that only one write takes place. This is in contrast to the copy-on-write algorithm, where two writes occur (one write to copy original data into the snapshot library and another write to copy any changed data).

According to an embodiment, the snapshot version of the data and the changed data of cache database 112 reside in the snapshot library 304. If a snapshot version is deleted, the data from snapshot library 304 may be merged back into cache database 112.

CONCLUSION

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for improving initial caching accuracy, comprising:
   receiving, at a server, one or more requests for data;
   populating, at a server, a cache with valid data, wherein the valid data is based on the one or more requests for data;
   monitoring, at a server, a response performance of the server; and
   when the response performance of the server is above a predetermined threshold, generating, at a server, one or more snapshot versions of a memory block, each snapshot version including a send priority, wherein the memory block contains the valid data in the cache.

2. The method of claim 1 further comprising:
   loading, at the server, the cache with one of the snapshot versions based on the send priority; and
   sending, from the server, the loaded snapshot version to a client device.

3. The method of claim 1, wherein generating one or more snapshots of a memory block further comprises:
   identifying a timestamp for each of the one or more snapshots;
   storing the one or more snapshots based on the timestamp; and
   setting the send priority for each of the one or more snapshots.

4. The method of claim 1, wherein the send priority is based on a performance rate of a client device at the time the snapshot is generated.

5. The method of claim 1, wherein the send priority is based on the timestamp.

6. The method of claim 1, wherein the send priority is based on the response performance.

7. The method of claim 1, wherein the one or more snapshot versions are copies of a current state of the valid data in the cache.

8. The method of claim 1, wherein one or more requests for data are requests to load one or more webpages.

9. The method of claim 1, wherein a response performance of the server is a ratio of cache hits to cache accesses in the cache.

10. The method of claim 1, wherein a response performance is measured at a predetermined periodicity.

11. The method of claim 2, wherein loading the cache with one of the snapshot versions takes place upon a startup of the server.

12. The method of claim 2, wherein loading the cache with one of the snapshot versions takes place upon a restart of the server.

13. The method of claim 2, wherein loading a snapshot version further comprises:
verifying the valid data of the snapshot version has not changed.

14. A system for improving initial caching accuracy, comprising:
a data manager configured to receive one or more requests for data and populate a cache with valid data, wherein the valid data is based on the one or more requests for data; and
a snapshot manager configured to monitor a response performance, when the response performance is above a predetermined threshold, and generate one or more snapshot versions of a memory block, each snapshot version including a send priority, wherein the memory block contains the valid data in the cache.

15. The system of claim 14, wherein the snapshot manager is further configured to load the cache with one of the snapshot versions based on the send priority.

16. The system of claim 15, wherein the data manager is further configured to send the loaded snapshot version.

17. The system of claim 15, wherein the cache is loaded with one of the snapshot versions upon a startup of the server.

18. The system of claim 15, wherein the cache is loaded with one of the snapshot versions place upon a restart of the server.

19. The system of claim 15, wherein the snapshot generator is further configured to:
verify the valid data of the snapshot version has not changed.

20. The system of claim 14, wherein the snapshot generator is further configured to:
identify a timestamp for each of the one or more snapshots;
store the one or more snapshots based on the timestamp; and
set the send priority for each of the one or more snapshots.

21. The system of claim 14, wherein the send priority is based on a performance rate of a client device at the time the snapshot is generated.

22. The system of claim 14, wherein the send priority is based on the timestamp.

23. The system of claim 14, wherein the send priority is based on the response performance.

24. The system of claim 14, wherein the one or more snapshot versions are copies of a current state of the valid data in the cache.

25. The system of claim 14, wherein the one or more requests for data are requests to load one or more webpages.

26. The system of claim 14, wherein the response performance of the server is a ratio of cache hits to cache accesses in the cache.

27. The system of claim 14, wherein the response performance is measured at a predetermined periodicity.

28. A non-transitory computer-readable storage medium storing software comprising instructions that, upon execution by one or more computers, cause the one or more computers to perform operations comprising:
receiving one or more requests for data;
populating a cache with valid data, wherein the valid data is based on the one or more requests for data;
monitoring a response performance; and when the response performance is above a predetermined threshold, generating one or more snapshot versions of a memory block, each snapshot version including a send priority, wherein the memory block contains the valid data in the cache.

29. The non-transitory computer-readable storage medium of claim 28, further comprising:
loading a cache with one of the snapshot versions based on the send priority; and
sending the loaded snapshot version to a client device.

30. The non-transitory computer-readable storage medium of claim 29, wherein loading the cache with one of the snapshot versions takes place upon a startup of the server.

31. The non-transitory computer-readable storage medium of claim 29, wherein loading the cache with one of the snapshot versions takes place upon a restart of the server.

32. The non-transitory computer-readable storage medium of claim 29, wherein loading a snapshot version further comprises: verifying the valid data of the snapshot version has not changed.

33. The non-transitory computer-readable storage medium of claim 28, wherein generating one or more snapshots of a memory block further comprises:
identifying a timestamp for each of the one or more snapshots; storing the one or more snapshots based on the timestamp; and setting the send priority for each of the one or more snapshots.

34. The non-transitory computer-readable storage medium of claim 30, wherein the send priority is based on a performance rate of a client device at the time the snapshot is generated.

35. The non-transitory computer-readable storage medium of claim 30, wherein the send priority is based on the timestamp.

36. The non-transitory computer-readable storage medium of claim 28, wherein the send priority is based on the response performance.

37. The non-transitory computer-readable storage medium of claim 28, wherein the one or more snapshot versions are copies of a current state of the valid data in the cache.

38. The non-transitory computer-readable storage medium of claim 28, wherein one or more requests for data are requests to load one or more webpages.

39. The non-transitory computer-readable storage medium of claim 28, wherein a response performance of the server is a ratio of cache hits to cache accesses in the cache.

40. The non-transitory computer-readable storage medium of claim 28, wherein a response performance is measured at a predetermined periodicity.

* * * * *